(No Model.)
L. F. BETTS.
BICYCLE LAMP.
No. 540,605. Patented June 4, 1895.
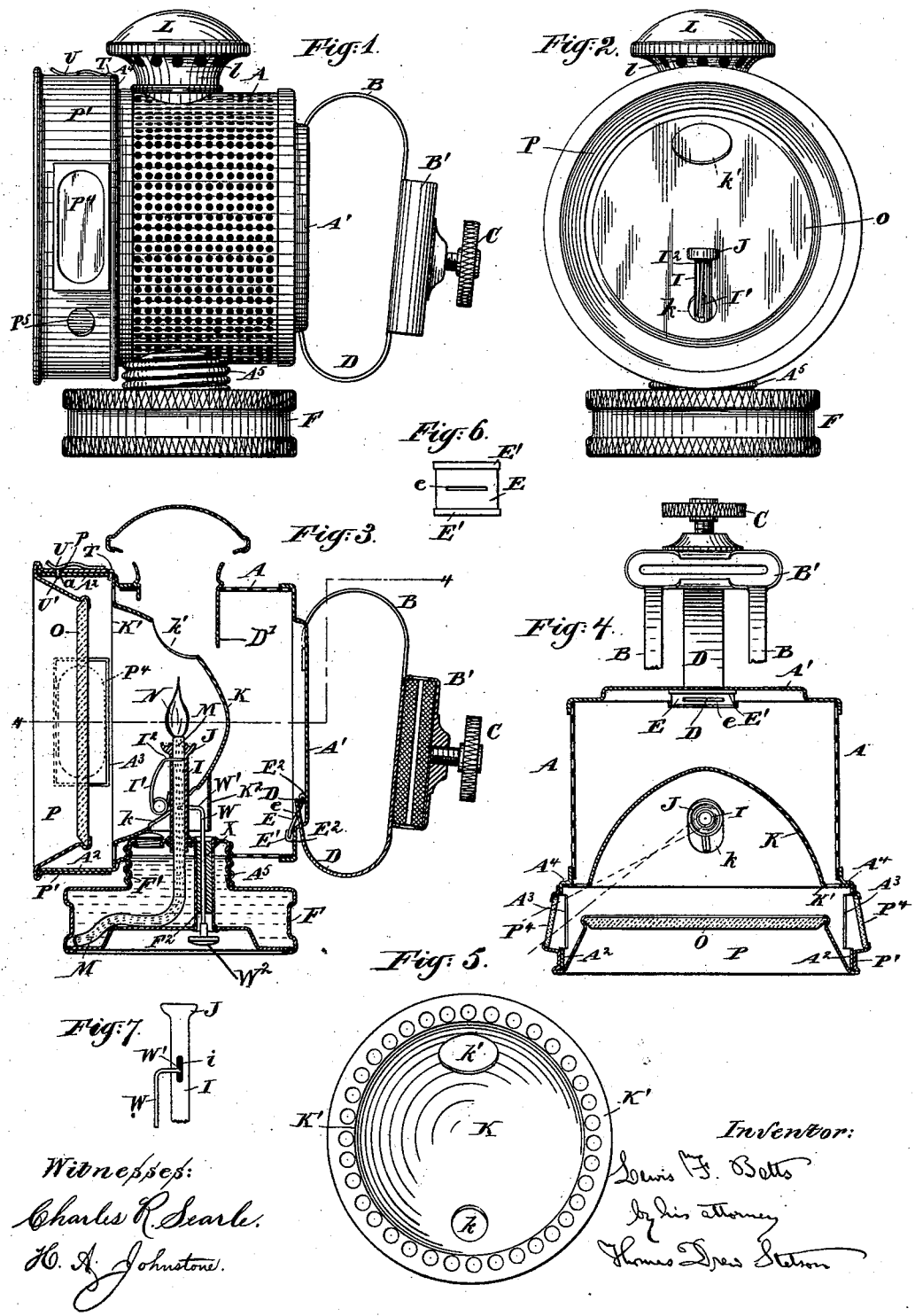

United States Patent Office.

LEWIS F. BETTS, OF BROOKLYN, NEW YORK, ASSIGNOR TO GEORGE B. WILSON, TRUSTEE, OF PHILADELPHIA, PENNSYLVANIA.

BICYCLE-LAMP.

SPECIFICATION forming part of Letters Patent No. 540,605, dated June 4, 1895.

Application filed July 27, 1894. Serial No. 518,694. (No model.)

*To all whom it may concern:*

Be it known that I, LEWIS F. BETTS, a citizen of the United States, residing in Brooklyn, in the county of Kings and State of New York, have invented a certain new and useful Improvement in Bicycle-Lamps, of which the following is a specification.

My improved lamp is adapted to apply on the proper bar of a bicycle and to be held by a pinching-screw in the ordinary and long approved manner. It has all the ordinary provisions for a small clear light well shielded from the wind, comprising among other ordinary features a reflector to throw the light forward, mounted within a case, with a fount and a spring connection of the whole, so that the concussions induced by the movements of the bicycle over irregularities in the road will be softened by the action of the springs. I have devised important improvements. I provide a highly yielding set of springs by which the lamp is mounted on the bicycle, and restrain the motions by a simple cut sheet of vulcanized india-rubber applied so as to induce a just sufficient friction. I provide for admitting the air to the flame with sufficient freedom, and yet softening its force, if too violent, by compelling it to traverse through a contracted space between the front edge of the reflector and the interior of the case, and then to reverse its motion before it can reach the flame. I provide further for softening the effect of the wind by inclosing the space around and in rear of the reflector in a finely perforated case, allowing the wind to enter from all directions, but softened in its force by being compelled to traverse such perforations before being allowed to flow through the annular aperture and be reversed in direction. In the preferable construction, the front of the reflector is flanged outward, and the flange perforated so liberally as to make its breadth serve as a clear and open space of that width so far as liberty for air to move is concerned, while the flange holds the parts reliably concentric under all strains. I have devised an improved construction of the glass face, and provide improved means for holding and detaching it. I mount on the upper portion of the wick-tube, near the top, a peculiar deflector and overflow cup, and shield from the wind the considerable aperture required to allow the parts to be inserted and removed. I provide a spring-pin which perforates the wick and insures the holding it reliably in position after it has been adjusted. A safeguard against the effect of wind from above is obtained by extending the cap down in the inside of the case nearly to the reflector. I provide improved means for allowing access for lighting, and for covering the aperture when not required, and for allowing the light to shine out through red glass at the sides.

The accompanying drawings form a part of this specification and represent what I consider the best means of carrying out the invention.

Figure 1 is a side elevation; Fig. 2, a front elevation; Fig. 3, a central longitudinal section corresponding to Fig. 1, and Fig. 4 a horizontal section on the line 4 4 in Fig. 3. The remaining figures represent portions detached. Fig. 5 is a front view of the reflector, with its liberally-perforated flange serving as a means for holding the reflector firmly in position and at the same time allowing the air to move forward freely through the nearly complete annular space between the reflector and the exterior case-ring. Fig. 6 represents the rubber friction-piece detached. Fig. 7 shows a portion of the wick-tube and of the wick-elevating rod.

Similar letters of reference indicate corresponding parts in all the figures where they appear.

A is a cylindrical casing, finely and liberally perforated. The back is stiffly joined to the case A and has a smaller swelled portion A', open at the bottom. Two top springs B, curved as shown, are stiffly connected to the upper portion of the swell A', and also stiffly connected to the ordinary flat socket B', equipped with a pinching-screw C for uniting it to the bar of the bicycle in the ordinary, long approved manner.

D is a bottom spring, correspondingly curved, and stiffly connected to the base of the socket B'. It reaches upward by its free end through the space in the bottom of the swell A'. It allows the lamp to vibrate vertically.

E is a sheet of soft vulcanized rubber, mounted in a sufficient, rigid frame or rim E′, held obliquely in the swell A′, and provided with a horizontal slit $e$ through which the free end of the spring D is thrust. The spring D may be so rigid that it will contribute but little, or not at all, to the elasticity of the support. When the lamp dances up and down in running over a rough road, the springs B perform their ordinary functions, and as the lamp moves upward and downward there is a frictional sliding of the rubber E up and down on the free end of the spring D. The friction induced by the rubber restrains the vibrations and avoids noise while the rubber thus guided by the spring D, in its turn, guides the elastically attached body or case A and its contents. I can make the rigid edge E′ extend quite around the rubber. I have shown it extending along only the upper and lower edges. I make these edges of thin iron or brass, tinned, and attach these parts to the metal of the back by solder $E^2$.

In front of the perforated casing A is a cylindrical extension $A^2$, which I will term the case-ring, preferably of a little larger diameter than the perforated casing A, which ring is unperforated except to provide window openings, as will presently appear.

O is a disk of thin plate-glass, of a diameter about equal to that of the front edge K′ of the reflector K. It is confined in the rear edge of a conical ring P, which, with the glass, constitutes my removable face. It will be observed that my face being completely detachable and partially revoluble not only allows the lamp to be opened at the front, but leaves the user at liberty to wipe the glass on both sides with a greater degree of force than can be conveniently applied with a hinged face, and provides for conveniently opening and closing a lighting aperture.

K is the concave reflector, preferably of parabolic form, arranged to have the small flame N lie in the focus. It has a sufficient hole $k$ in the lower side, and a hole $k'$ in the upper side, which comes directly over the flame when the lamp is in its ordinary upright position.

L is a cap, having an ornamental form, perforated as indicated by $l$. It is set over the aperture $k'$. The lower end L′ of this cap is larger than the aperture $k'$, and is cut to conform approximately to the shape of the adjacent part of the reflector K. The lower edge D′ of the cap is cut to correspond to the adjacent portion of the concave reflector and is held so as to nearly but not quite touch such reflector. By nearly touching it prevents any considerable draft of air to extinguish the flame and by not quite touching it avoids the conduction of heat downward from the cap L to injuriously affect the parts below. When in any exigency the lamp is exposed to a blast of wind from the upper side downward, it cannot, after passing the restraint imposed by the perforated body A, move under the base of the cap with sufficient force to injuriously affect the flame.

The front edge of the concave reflector K is flanged outward, as indicated by K′. This flange is liberally perforated. It allows the air to move forward past it with very nearly the same freedom as if it was entirely open.

When the face is to be inserted, the reflector K with its flange K′ is thrust in from the front and pressed backward until the rim of the flange K′ meets an internal bead or offset $A^4$ at the junction of the perforated casing A with the imperforate case-ring $A^2$. Pins T are inserted through suitable small holes in front of the flange K′ to hold it and the attached reflector reliably in position. These pins may be permanently connected by springs, if desired.

My construction provides a practically continuous annular aperture around the front of the reflector, through which aperture the air which supports the flame is received. The checking of the approach of the air by the perforated case A is one factor in the moderating of the flow of the air to the flame, the passage of the air through the perforated flange K′, which constitutes practically a narrow aperture between the front of the concave reflector and the interior of the case-ring $A^2$, is a second factor, and the provision that the air, so flowing forward, must reverse its direction after striking the front glass and flow rearward to reach the flame, is a third factor of the problem. The arrangement reduces the violence of the flow of air when liable to become excessive, yet provides a liberal supply of air moving gently to the flame under all conditions.

The ring P is spun, or otherwise formed, of sheet brass or other suitable material, having a broad flange P′ extending cylindrically rearward from its front edge. In this flange are formed two windows $P^4$, $P^4$, which come on the right and left side respectively when this ring is turned in the proper position. The case-ring $A^2$ is formed with two corresponding apertures, and when adjusted for use the windows $P^4$ coincide with these apertures. The rear end of the conical ring P is set sufficiently forward from the end of the reflector to allow light from the flame to pass outward and illumine the side-lights $P^4$. I make in this ring P′ a small hole $P^5$, which, when the lamp is in use, is presented against an imperforate portion of the case-ring $A^2$ and is then of no effect. When it is desired to light the lamp, the face is turned a portion of a revolution, carrying the side lights or colored windows $P^4$, $P^4$, out of coincidence with the holes $A^3$, $A^3$, and rendering them for the time being of no effect; but when the face is turned to a sufficient extent, it brings the aperture $P^5$ into coincidence with one of the window apertures $A^3$, and in this condition of the parts a match, previously lighted, may be thrust in through the coinciding holes $P^5$ and $A^3$, and thus reach the wick-tube and ignite the wick. The parts are again restored to the position to work by simply turning the face back again to its proper working position. I provide a spring-catch U at the top, or at other convenient point on the case-ring A², which carries a pin U′, which, when allowed, springs inward through two small holes p, a, one in the flange P′ and the other in the case-ring A². This spring-pin U′, thus engaged, insures the retention of the face, and also insures that it is set in the correct position to show the side-lights.

F is the lamp-fount, adapted to contain kerosene or other oil. It is formed with a screw-threaded top extending upward, as indicated by F′. Its screw-thread engages a corresponding screw-threaded portion A⁵ extending upward in the interior of the case A. The wick-tube I is soldered, or otherwise set, in this top, extending upward to a sufficient extent.

J is a deflector, formed as shown, set on the wick-tube I near its upper end, and soldered, or otherwise rigidly joined, and presenting in its upper side an annular pocket, which under frequently recurring conditions in ordinary practice retains a little oil. The oil overflowing from the wick, and thus caught, becomes afterward volatile with the heat, and contributes to the efficiency of the small flame. This deflector in my lamp performs a double function: first, and mainly, by modifying the currents of air flowing upward through the aperture k and preventing any from moving forcibly against the base of the flame in an upward direction, and, second, by holding any surplus oil which exudes from the wick and retaining it in the hot cup, to be subsequently transformed into combustible vapor. My deflector adds both to the permanence with which the flame will be held under adverse conditions of violent or irregular winds and sudden concussions, and also adds somewhat to the amount of flame produced with a given elevation of the wick.

The wick is operated by a rod W, which extends up through a frictional lining X of leather, or the like, inclosed in a tube F² which traverses the fount F. It is provided with a button W² at its lower end, which is easily accessible to raise or lower it by a direct pull or thrust to any required large or small amount. An arm W′ extends horizontally from the top of this rod and applies in a slit i in the side of the wick-tube I, thus engaging the wick, so that as the rod W is raised or lowered the wick will be correspondingly actuated.

K² is a skirt extending down from the under side of the reflector K around the aperture k. The space between the lower edge of such skirt and the top of the fount is slight. The skirt shields such aperture from any force of wind.

I² is a pin playing horizontally in and out through a small hole in the front of the tube I, and connected by a spring-arm I′, which latter is soldered, or otherwise stiffly attached, to the tube I. This pin must be held out of the tube by some suitable means when the wick M is raised or lowered by the action of the rod W, so as to induce a just sufficient small flame. When the wick is correctly adjusted, the spring I′ is liberated and the spring-pin I² is thrust inward by the force thereof nearly or quite across the interior of the upper wick-tube, and aids to hold the wick M reliably against working upward or downward.

Modifications may be made without departing from the principle or sacrificing the advantages of the invention. I can make the flat curved arm D rigid instead of elastic, and the play of its free end up and down through the rubber E will produce very nearly the same effect. I can use two or more such arms or springs, providing a corresponding space equipped with corresponding sheets of rubber E, each slit horizontally to receive its proper arm and to hold it gently. I can vary the means E′ for holding the rubber. Parts of the invention can be used without the whole. I can omit the spring-pin I².

Although I have described this as a bicycle lamp, it may be useful for various other purposes. One use which renders available nearly or quite all its peculiarities is to serve on the front of a dash-board of a two-wheeled or four-wheeled carriage.

I claim as my invention—

1. In a bicycle lamp, a case carrying a fount, wick-tube and reflector, the yielding frictional check E, and the top spring B connecting said case with the socket B′ and a bottom spring D, the latter playing through the said frictional check E, all arranged for joint operation substantially as herein specified.

2. In a bicycle lamp, the perforated case A, imperforate case-ring A², wick-tube I and concave reflector K, the latter provided with a flange K′ having large perforations and adapted to hold the reflector concentrically within the case-ring while allowing an easy flow of the air, in combination with the internal bead A⁴ in said case-ring, and with securing means U for holding and releasing the parts, all arranged to serve substantially as herein specified.

3. In a bicycle lamp, the perforated case A, the imperforate case-ring A² and concave reflector K, the latter presenting a narrow space between its front and the interior of said case-ring, and the cap L extending downward from the top of said case nearly but not quite to the said reflector, and shaped at its lower edge to correspond so as to lie near the reflector but not to conduct heat thereto, all arranged for joint operation as herein specified.

4. In a bicycle lamp, the perforated case A, imperforate case-ring A² with its window apertures A³, concave reflector K, presenting a substantially annular passage for the flow of air forward between the body of said reflector and the interior of said case-ring, the fount F and wick-tube I, in combination with a face composed of the glass O and conical ring P, a cylindrical flange P', provided with the colored side windows P⁴ arranged to allow light to shine forward through the glass O, and also obliquely through said window apertures A³ and said colored side windows P⁴, all arranged for joint operation substantially as herein specified.

5. In a bicycle lamp, the perforated case A, imperforate case-ring A² with its window apertures A³, concave reflector K, presenting a substantially annular passage for the flow of air forward between the body of said reflector and the interior of said case-ring, the fount F and wick-tube I, in combination with a face composed of the glass O and conical ring P, a cylindrical flange P', provided with the colored side windows P⁴, and also with a lighting aperture P⁵, and confining means U, U' adapted to allow the face to be partially revolved to bring the aperture P⁵ into and out of coincidence with one of the apertures A³ and also to allow the face to be attached and detached, all arranged for joint operation substantially as herein specified.

6. In a bicycle lamp, the perforated case A, imperforate case-ring A², wick tube I and concave reflector K, the latter presenting a narrow space between its front and the interior of the said case-ring, and having a liberal opening for the insertion and removal of the wick-tube and its adjuncts, in combination with each other and with the skirt K² around said aperture, and the deflector J on said wick-tube, all arranged for joint operation substantially as herein specified.

In testimony that I claim the invention above set forth I affix my signature in presence of two witnesses.

LEWIS F. BETTS.

Witnesses:
H. A. JOHNSTONE,
M. F. BOYLE.